United States Patent [19]

Merger et al.

[11] Patent Number: 4,622,428

[45] Date of Patent: Nov. 11, 1986

[54] PREPARATION OF 1,3-DIAMINO-2,2-DIALKYLPROPANES

[75] Inventors: Franz Merger, Frankenthal; Dieter Voges, Mannheim, both of Fed. Rep. of Germany; Siegfried Winderl, Tokyo, Japan

[73] Assignee: BASF Aktiengesellschaft, Fed. Rep. of Germany

[21] Appl. No.: 543,161

[22] Filed: Oct. 18, 1983

[30] Foreign Application Priority Data

Oct. 21, 1982 [DE] Fed. Rep. of Germany ....... 3238931

[51] Int. Cl.$^4$ .............................................. C07C 85/06
[52] U.S. Cl. .................................... 564/480; 564/479
[58] Field of Search ................ 564/480, 479, 478, 469

[56] References Cited

U.S. PATENT DOCUMENTS

| | | | |
|---|---|---|---|
| 2,166,152 | 7/1939 | Howk | 564/491 |
| 3,137,730 | 6/1964 | Fitz-William | 260/585 |
| 4,014,933 | 3/1977 | Boettger et al. | 564/491 |
| 4,078,003 | 3/1978 | Feichtinger et al. | 564/480 |

OTHER PUBLICATIONS

J. Am. Chem. Soc. 71, (1949), 3249.
Ullmanns Encyklopadie der Technischen Chemie, 4th ed., vol. 13, pp. 558 et seq.

*Primary Examiner*—Paul F. Shaver
*Attorney, Agent, or Firm*—Keil & Weinkauf

[57] ABSTRACT

1,3-Diamino-2,2-dialkylpropanes whose alkyl substituents are each of 1 to 4 carbon atoms are prepared by reacting the corresponding 2,2-dialkylpropane-1,3-diols with ammonia in the presence of hydrogen under superatmospheric pressure by a process in which the reaction is carried out in solution and in the presence of a cobalt-containing catalyst.

5 Claims, No Drawings

PREPARATION OF 1,3-DIAMINO-2,2-DIALKYLPROPANES

The present invention relates to a novel process for the preparation of 1,3-diamino-2,2-dialkylpropanes starting from the corresponding diols.

German Published Application DAS No. 1,172,268, German Laid-Open Application DOS No. 1,953,263 and U.S. Pat. No. 3,137,730 propose the preparation of simple diamines (eg. ethylenediamine and its homologs) from the corresponding glycols and ammonia or primary or secondary amines, using a catalyst containing cobalt, nickel and copper, under aminolytic conditions.

German Laid-Open Application DOS No. 2,358,355 discloses that one of the factors which has a decisive effect on the mechanism of the aminolysis of $\alpha,\omega$-diols, and hence also on the nature and quantity of by-products formed, is the structure of these diols.

This problem is particularly evident in the field of the sterically hindered 1,3-diamino-2,2-dialkylpropanes, which have been little investigated to date.

For a long time the only method of preparing 1,3-diamino-2,2-dimethylpropane, the most well-known member of this class, was by means of very involved C—C linkage reactions, etc. (J.Am.Chem.Soc. 71, (1949), 3249). Its synthesis from 2,2-dimethylpropane-1,3-diol in the presence of a nickel catalyst by ammonolysis under pressure was first described in German Laid-Open Application DOS No. 2,358,355. However, this synthesis also gave a broad spectrum of by-products (formaldehyde, isobutyraldehyde and the compounds methylamine and isobutylamine resulting from reductive amination of these aldehydes), which limited the yield of the desired product to 78% of theory.

Moreover, it was found that another by-product (N-methyl-1,3-diamino-2,2-dimethlpropane) which however is not mentioned in the above publication (loc. cit.), is very difficult to separate from the principal product.

Apart from the structure of the starting material, the nature of the catalyst employed is probably also critically important with regard to this product distribution.

It is an object of the present invention to provide a process for the preparation of sterically hindered 1,3-diamino-2,2-dialkylpropanes which gives the desired products in good yield and purity.

We have found that this object is achieved, and that 1,3-diamino-2,2-dialkylpropanes whose alkyl substituents are each of 1 to 4 carbon atoms are advantageously obtained by reacting the corresponding 2,2-dialkylpropane-1,3-diols with ammonia in the presence of hydrogen under superatmospheric pressure, if the reaction is carried out in solution and in the presence of a cobalt-containing catalyst.

The novel process can be carried out either continuously or batchwise, and its use greatly restricts the formation of by-products.

Examples of suitable 2,2-dialkyl-substituted propane-1,3-diols are neopentylglycol (2,2-dimethylpropane-1,3-diol), 2-methyl-2-ethylpropane-1,3-diol, 2,2-diethylpropane-1,3-diol, 2-methyl-2-i-propylpropane-1,3-diol and 2-ethyl-2-butylpropane-1,3-diol.

The reaction of the diol with ammonia in the presence of hydrogen is carried out in solution, the solvent used being inert under the particular reaction conditions. Examples of such solvents include the aromatic hydrocarbons (eg. toluene or xylene) and the ethers. Advantageously, an ether is employed, for example tetrahydrofuran, dioxane or ethylene glycol dimethyl ether.

In some cases it is advantageous to carry out the reaction using water as a solvent. For example, the reaction with neopentylglycol is preferably carried out in aqueous solution.

The cobalt-containing catalysts required for the reaction contain from 18 to 25% by weight of cobalt oxide, from 0 to 1.5% by weight of chromium oxide or manganese oxide and from 0.1 to 0.3% by weight of sodium oxide, the percentages in each case being based on the total weight of the catalysts.

Furthermore, in the catalysts in the unreduced state, as much as 60% by weight of the cobalt oxide can be replaced by nickel oxide and copper oxide. The weight ratio of nickel oxide to copper oxide in the catalyst should be from 2:1 to 3:1.

The catalysts are usually in the form of supported catalysts. The carrier materials are conventional substances, such as aluminum oxide or silicon oxide.

However, the novel process is also intended to include the use of unsupported catalysts, the percentages by weight which relate to supported catalysts being modified appropriately.

The catalysts are prepared by a conventional method, as described in, for example, Ullmanns Encyklopädie der technischen Chemie, 4th edition, volume 13, page 558 et seq., and the secondary literature cited therein.

The reaction conditions can be varied over a substantial range. The continuous procedure is particularly advantageously carried out at from 160° to 240° C., preferably from 170° to 220° C. The pressure employed is from 150 to 300 bar, the partial pressure of the ammonia being about 115 bar and that of the hydrogen from 35 to 125 bar.

The Examples which follow illustrate the process according to the invention.

EXAMPLE 1

This example describes comparative experiments which have been carried out in order to choose the catalysts to be tested.

The following catalysts have been employed:

| | Component in the unreduced state [% by weight] | | | | | | Carrier Material |
|---|---|---|---|---|---|---|---|
| | CoO | NiO | Mn$_3$O$_4$ | CuO | Cr$_2$O$_3$ | Na$_2$O | |
| Catalyst 1 | 23.1 | — | 1.1 | — | — | 0.1 | 75.7 (Al$_2$O$_3$) |
| Catalyst 2 | 9.8 | 9.5 | — | 4.0 | — | — | 76.7 (Al$_2$O$_3$) |
| Comparative catalyst 3 | — | 21.3 | 2.1 | 7.6 | — | 0.4 | 68.6 (SiO$_2$) |
| Comparative catalyst 4 | — | 62.4 | — | — | — | — | 37.6 (Al$_2$O$_3$) |
| Comparative catalyst 5 | — | 61.4 | — | — | 14.5 | — | 24.1 (SiO$_2$) |
| Comparative catalyst 6 | — | 61.4 | — | — | 14.5 | — | 24.1 (Al$_2$O$_3$) |

3.5 liter samples of catalyst extrudates of the above composition were introduced into a reactor having a length of 3.5 m and a free cross-section of 14 cm$^2$.

The catalyst was heated to 300° C. (catalyst 1 and 2) or 450° C. (comparative catalysts 3 to 6), and was reduced in a stream of hydrogen for 48 hours. After cooling to 30° C., it was impregnated with liquid ammonia.

Reaction conditions:
(a) Feed:
300 ml/hour of a 70% strength by weight aqueous solution of 2,2-dimethylpropane-1,3-diol and 1000 ml/hour of liquid ammonia.
(b) Temperature:
As a function of the conversion and of the yield of NPDA. The temperature chosen in each case was that which gave the best results (see below).
(c) Pressure:
250 bar (hydrogen)
(d) Exit gas: 300 liters (S.T.P.)/hour.

rahydrofuran and 360 g of liquid ammonia were passed over 0.5 liters of the reduced Catalyst 1 (cf. Example 1). The reaction temperature was kept at 190° C. and the pressure at 250 bar (hydrogen). The amount of exit gas was 100 liters (S.T.P.)/hour.

For 77% conversion (based on anhydrous substance) of the starting material, the material discharged from the reactor contained 41% by weight of 1,3-diamino-2-methyl-2-propylpropane, corresponding to a yield of 53%.

EXAMPLE 4

2-methyl-2-ethylpropane-1,3-diol was converted by a procedure similar to that described in Example 3.

Results for comparison:
GC analysis (anhydrous) [% by weight]

|  | Reaction temperature °C. | Conversion [%] | Yield [%] | First fraction | NPDA* | N—methyl-* NPDA | NPOLA* | Other products | NPG* | Last fraction and residue |
|---|---|---|---|---|---|---|---|---|---|---|
| Catalyst 1 | 220 | 99.6 | 63.9 | 12.2 | 63.7 | 0.4 | 10.4 | 4.0 | 0.4 | 8.9 |
| Catalyst 2 | 200 | 96.5 | 70.6 | 4.0 | 68.1 | 3.1 | 19.9 | 0.7 | 3.5 | 0.7 |
| Comparative catalyst 3 | 240 | 91.0 | 57.9 | 25.3 | 52.7 | 4.5 | 5.5 | 2.4 | 9.0 | 0.6 |
| Comparative catalyst 4 | 240 | 86.8 | 38.5 | 21.8 | 33.4 | 19.8 | 2.2 | 4.5 | 13.2 | 5.1 |
| Comparative catalyst 5 | 210 | 75.8 | 42.6 | 16.6 | 32.3 | 3.8 | 11.6 | 3.1 | 24.2 | 9.3 |
| Comparative catalyst 6 | 210 | 67.5 | 40.9 | 11.3 | 27.6 | 3.3 | 11.6 | 7.5 | 32.5 | 6.2 |

The yield is based in each case on 2,2-dimethylpropane-1,3-diol converted.
*NPDA = Neopentanediamine = 1,3-diamino-2,2-dimethylpropane
N—Methyl-NPDA = N—Methyl-1,3-diamino-2,2-dimethylpropane
NPOLA = Neopentanolamine = 1-amino-2,2-dimethylpropan-3-ol
NPG = Neopentylglycol = 2,2-dimethylpropane-1,3-diol.

While the novel catalysts 1 and 2 gave conversions <96% and yields of from 60 to 70%, the comparative catalysts 3 to 6 gave (at as high as 240° C.!) conversions of from 67 to 91% and yields of only 38 or 58%.

EXAMPLE 2

200 liters of catalyst 2 (see Example 1) were introduced into an 8 m long high-pressure reactor and were reduced. 20 kg/hour of a 70% strength by weight aqueous 2,2-dimethylpropane-1,3-diol solution and 125 kg/hour of liquid ammonia were passed into the reactor at 195°–200° C. and under a pressure of 250 bar (hydrogen), the amount of cycle gas being 50 m$^3$(S.T.P.)/hour. The material discharged from the reactor was analyzed daily and found to contain the following components (based on anhydrous substance):

| First fraction | 0.2–0.3% |
|---|---|
| N—Methyl NPDA* | 2.3–2.5% |
| NPDA | 87.6–87.0% |
| NPOLA | 3.0–4.0% |
| NPG | 0.2–0.1% |
| Last fraction | 5.2–5.4% |
| Residue | 1.5–0.7% |

*See Example 1 for symbols.

For virtually quantitative conversion, the yield was from 87 to 88%.

EXAMPLE 3

In a 1 liter reactor having a length of 1.7 m and a free cross-section of 5.3 cm$^2$, 90 g/hour of a solution of 50% by weight of 2-methyl-2-propylpropane-1,3-diol in tet- For 75% conversion (based on anhydrous substance) of the starting material, the material discharged from the reactor contained 46% by weight of 1,3-diamino-2-methyl-2-ethylpropane, corresponding to a yield of 61%.

We claim:
1. A process for the preparation of a 1,3-diamino-2,2-dialkylpropane whose alkyl substituents are each of 1 to 4 carbon atoms which comprises: reacting a solvent solution of the corresponding 2,2-dialkylpropane-1,3-diol with ammonia in the presence of hydrogen under superatmospheric pressure in the presence of a cobalt-containing catalyst.
2. The process of claim 1, wherein the cobalt-containing catalyst in the unreduced state contains from 18 to 25% by weight of cobalt oxide, from 0 to 1.5% by weight of chromium oxide or manganese oxide and from 0.1 to 0.3% by weight of sodium oxide, the percentages in each case being based on the total weight of the catalyst.
3. The process of claim 1, wherein, in the cobalt-containing catalyst in the unreduced state, as much as 60% by weight of the cobalt oxide is replaced by nickel oxide and copper oxide, the weight ratio of nickel oxide to copper oxide being from 2:1 to 3:1.
4. The process of claim 1, wherein the reaction is carried out at from 170° to 220° C.
5. The process of claim 2, wherein an aqueous solution of neopentylglycol is reacted with ammonia in the presence of hydrogen.

* * * * *